(No Model.)
S. J. SULLIVAN.
CHURN.
No. 324,277.  Patented Aug. 11, 1885.
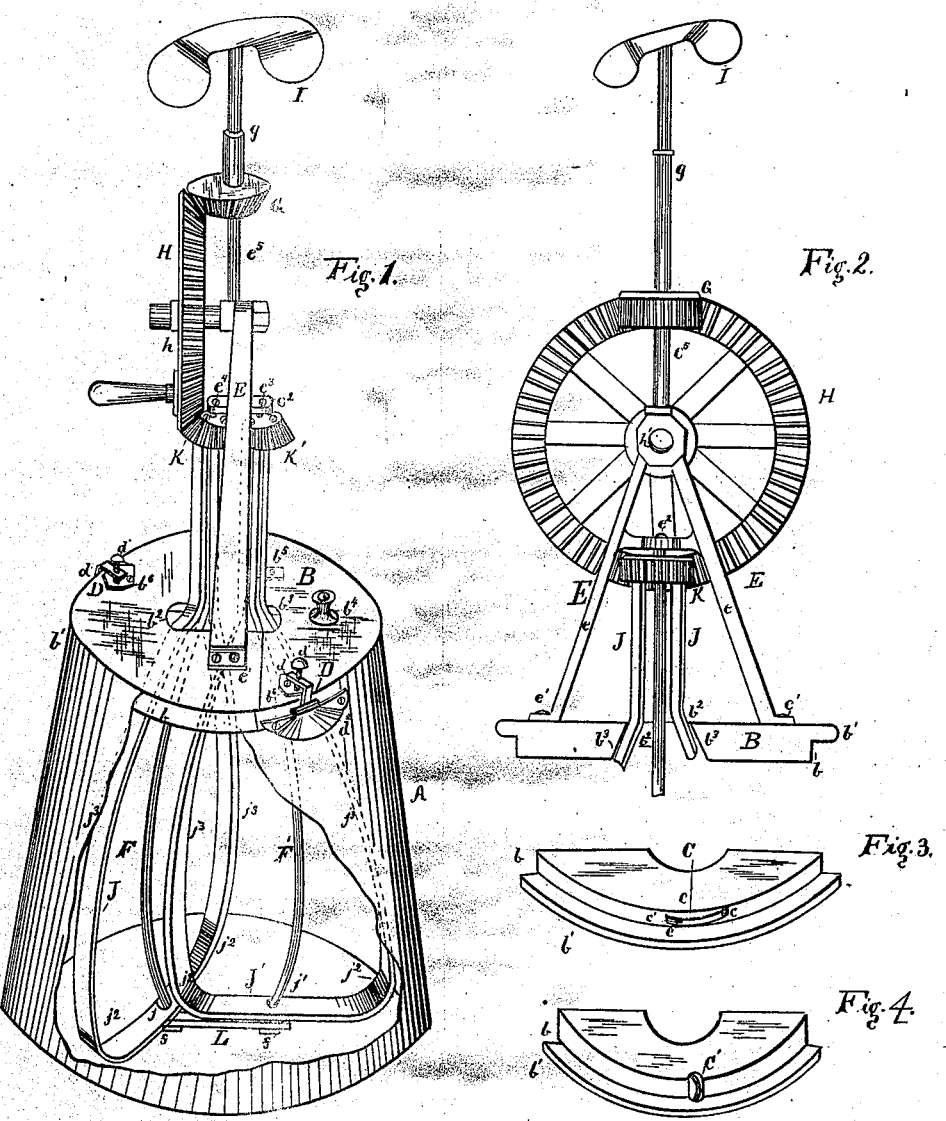
Witnesses
F. M. Clarke
S. H. F. Clarke
Inventor
Samuel J. Sullivan,
By S. A. Haseltine + Bro.
Attorneys.

UNITED STATES PATENT OFFICE.

SAMUEL J. SULLIVAN, OF LAMAR, MISSOURI.

CHURN.

SPECIFICATION forming part of Letters Patent No. 324,277, dated August 11, 1885.

Application filed March 23, 1885. (No model.)

*To all whom it may concern:*

Be it known that I, SAMUEL J. SULLIVAN, a citizen of the United States, residing at Lamar, in the county of Barton and State of Missouri, have invented certain new and useful Improvements in Churns; and I do hereby declare the following to be a full, clear, and exact description of the invention, such as will enable others skilled in the art to which it appertains to make and use the same.

My invention relates to improvements in churns, the object of which is to provide an easy, convenient, and rapid means of churning and obtaining butter from cream, and also to provide a churn that is easily cleaned and simple in construction, and one the dashers of which suck air down into the cream, and at the same time stir all parts of it. These objects I attain by means of the device illustrated in the accompanying drawings, forming a part of this specification, in which—

Figure 1 is a view in elevation showing the entire device, a part of the vessel being removed to show the interior. Figs. 2 and 3 are detailed views. Fig. 4 shows the cover having a modified form of spring.

A is a vessel, made of any suitable material, and of any convenient size, preferably round, and tapering from the bottom to the top.

B is a cover having a rabbet, $b$, to fit closely in the top of the vessel, and having a flange, $b'$, which projects over the edges thereof. Said cover has a slot, $b^2$, in the center, which is beveled on the lower side, $b^3$. It and the cover are divided into two parts, to facilitate its removal and the better to clean the dashers passing through it.

D are combined catches and handles attached to the sides of the vessel by means of screws, to hold the cover firmly in its place. Said catches may be on either, but are preferably on both sides. The part of the cover having the knob $b^4$ has a spring, C, secured in the rabbet by means of a screw, $c$, and having a slot, $c'$, to give it freedom of motion. Said spring is to keep the parts of the cover close together. C', Fig. 4, shows a modified form of spring that may be used, when desired, in place of spring C. The catches $d$ are elbow-shaped, having holes for thumb-screws $d'$, which are made to enter holes in the plates $b^6$ of the cover, the other end being hinged to a handle, $d^2$, as shown. Said handles are used for handling, while the hinged elbow-pieces $d$ hold the cover and gearing in place. $b^5$ is a button to swing across the place where the cover divides. $b^4$ is a knob to raise one part of the cover.

E is a support in the shape of the letter A, having spreading legs $e\ e$ (both attached to one and the same part of the cover by foot-pieces $e'\ e'$) and a bridge, $e^2$, which has holes $e^3\ e^4$, for receiving the supporting-rods F F'. It has an upper portion, $e^5$, made to support a pinion, G, which is hung so as to engage the crank or drive wheel H. Said pinion serves as a support to steady the upper side of the drive-wheel when in operation. In its upper end is a hole, $g$, made of any desired size and shape, for receiving the handle of a fan for keeping dust and flies from the churn, and also for creating a breeze for the operator. The fan may be removed when desired.

The dashers J J' are constructed and placed in the vessel as follows: They are each bent to form a bottle-shaped opening, the ends coming close together where they pass through the cover, and, passing up parallel through pinions K K', are riveted on the upper sides of the same. In a lower part of these dashers are holes $j\ j'$, for receiving the supporting-rods F F', which pass through them. L is a bottom or cross piece, through which the supporting-rods pass, and below which they are secured by means of screw-nuts $f\ f'$. These dashers and supports are made of sufficient length to let the piece L rest near or upon the bottom of the vessel, and are wide enough to stir all parts of the cream, the corners $j^2$ reaching nearly to the corners of the vessel, and the sides $j^3$ being nearly parallel with the sides of the same. These dashers are made and hung so as to revolve in opposite directions without interfering with each other. They are operated by the drive-wheel H, operating upon one of the pinions K', which drives the other pinion, K, and to these pinions are attached the dashers, as above set forth. The rods F F' pass through the center of these pinions, forming bearings for the same, and are screwed into the bridge-piece.

The drive-wheel H is secured to the top of the support E by means of a bolt, $h$, having threads to screw into the hole $h'$, which has threads to receive it.

Having thus described my invention, what I claim as new, and desire to secure by Letters Patent, is—

1. In combination with an A-shaped support, E, having legs $e\ e$ and screw-threads $h'$ and bridge $e^2$, having screw-threads $e^3\ e^4$, foot-pieces $e'\ e'$, a drive-wheel, H, having an axle-pin, $h$, pinions K K′, supporting-rods F F′, cross-piece L, dashers J J′, cover B, having a beveled slot, $b^2$, plates $b^6$, and elbow-shaped catches $d$, having thumb-screw $d'$ and handle $d^2$, all substantially as shown and described.

2. In combination with a vessel and cover, an elbow-shaped hinged catch and handle, D, an A-shaped support, E, composed of legs $e\ e$, feet $e'\ e'$, and bridge $e^2$, said support having extension $e^5$, pinion G, and fan I, drive-wheel H, pinions K K′, dashers J J′, supporting-rods F F′, and cross-piece L, all substantially as and for the purpose set forth.

In testimony whereof I affix my signature in presence of two witnesses.

SAMUEL J. SULLIVAN.

Witnesses:
G. C. HIXSON,
WALTER J. MILLER.